US010600226B2

(12) United States Patent
Yam

(10) Patent No.: US 10,600,226 B2
(45) Date of Patent: Mar. 24, 2020

(54) SYSTEM AND METHOD FOR MANIPULATING A FACIAL IMAGE AND A SYSTEM FOR ANIMATING A FACIAL IMAGE

(71) Applicant: Success Asia Inc Limited, Causeway Bay (HK)

(72) Inventor: Chung Pong Lloyd Yam, Causeway Bay (HK)

(73) Assignee: The University of Hong Kong, Hong Kong (HK)

( * ) Notice: Subject to any disclaimer, the term of this patent is extended or adjusted under 35 U.S.C. 154(b) by 139 days.

(21) Appl. No.: 15/460,417

(22) Filed: Mar. 16, 2017

(65) Prior Publication Data
US 2018/0068482 A1 Mar. 8, 2018

(30) Foreign Application Priority Data
Sep. 7, 2016 (HK) .................................... 16110630

(51) Int. Cl.
*G06T 13/80* (2011.01)
*G06T 13/40* (2011.01)

(52) U.S. Cl.
CPC .............. *G06T 13/80* (2013.01); *G06T 13/40* (2013.01)

(58) Field of Classification Search
CPC ................................. G06T 13/80; G06T 13/40
See application file for complete search history.

(56) References Cited

U.S. PATENT DOCUMENTS

| 6,693,646 B1* | 2/2004 | Jones ...................... G06T 13/80 345/419 |
| 2010/0007665 A1* | 1/2010 | Smith ..................... G06T 13/40 345/473 |
| 2013/0169827 A1* | 7/2013 | Santos ............... H04N 5/23229 348/207.1 |
| 2015/0029362 A1* | 1/2015 | Jeong ..................... G06T 11/60 348/231.2 |

* cited by examiner

*Primary Examiner* — Chong Wu

(57) ABSTRACT

A system and method for manipulating a facial image includes the steps of receiving a facial image of a subject, segmenting the facial image into one or more segments, wherein each of the one or more segments is associated with one or more facial features of the subject, and manipulating the one or more segments.

27 Claims, 17 Drawing Sheets

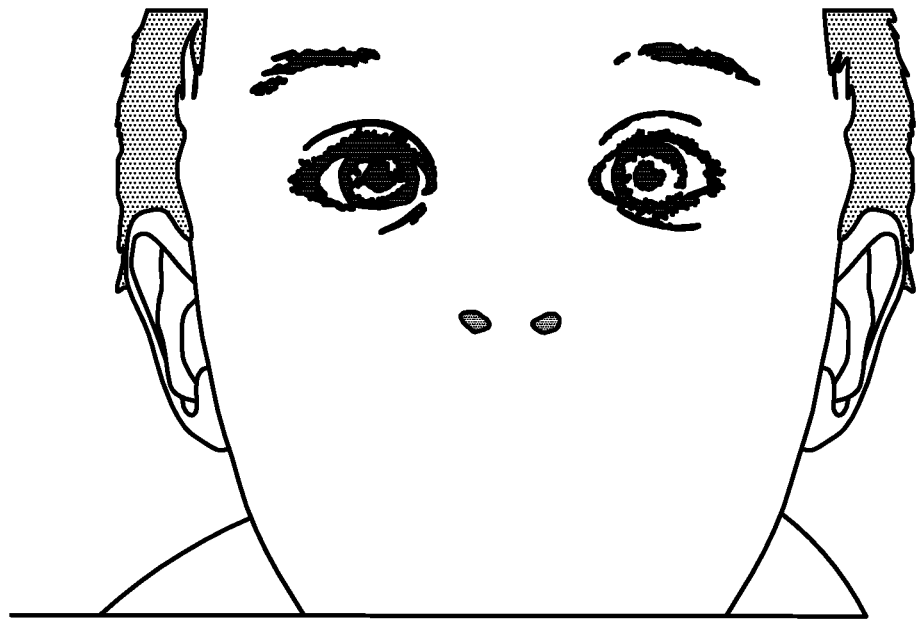
Fig. 3C ( i )
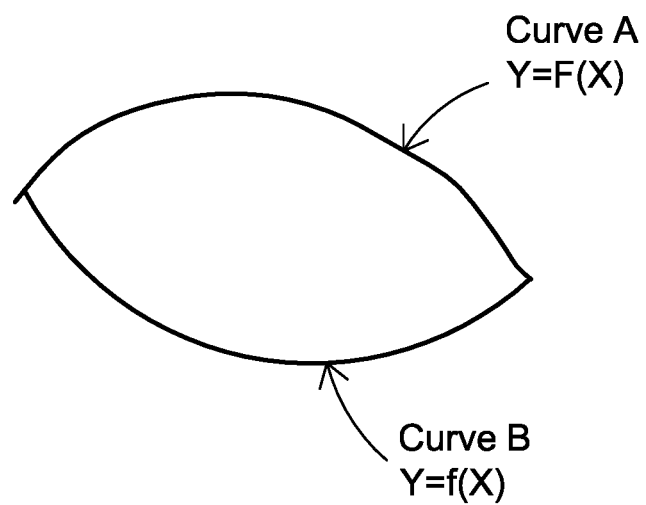
Fig. 3C ( ii )

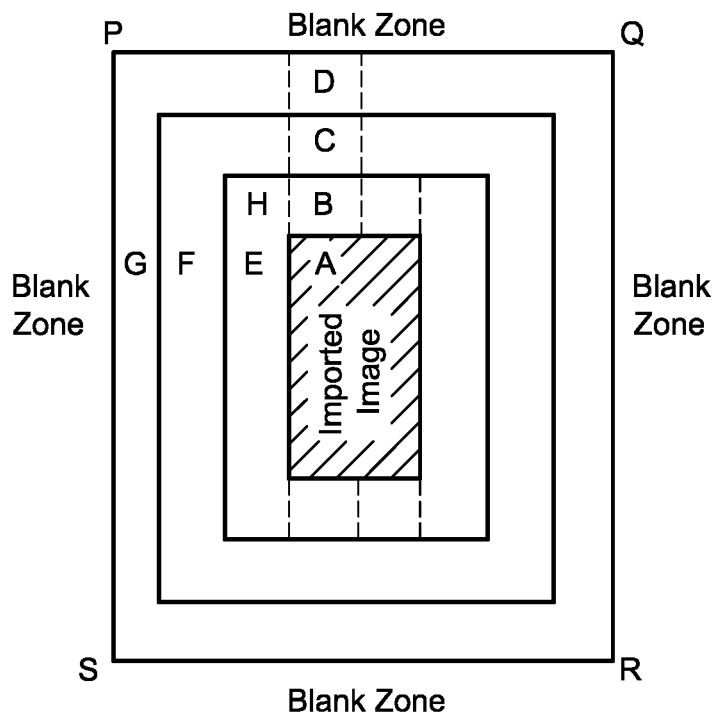
Fig. 3D ( i )
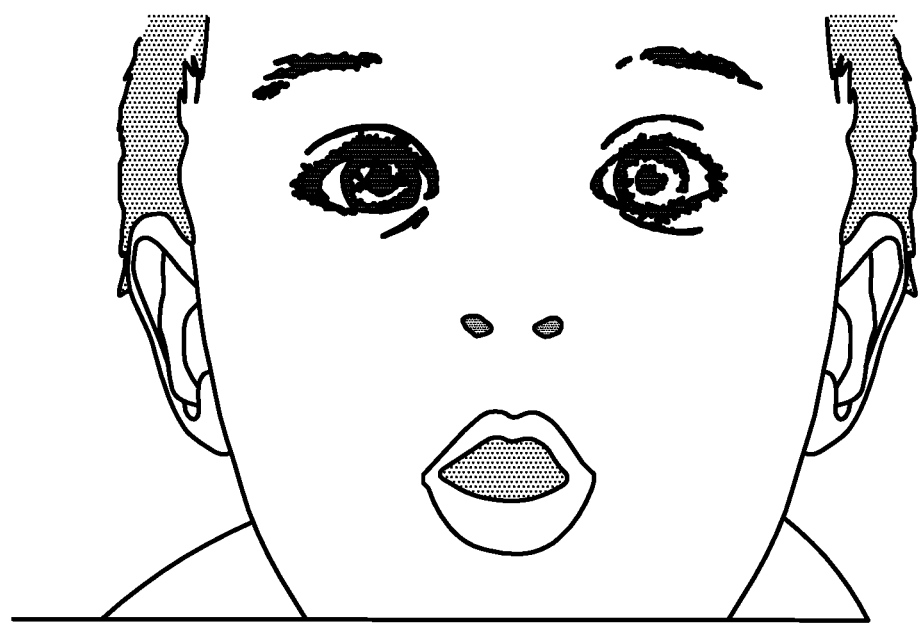
Fig. 3D ( ii )

| | Forehead | Eyebrows | Eyelids | Eyes | -- | -- | -- | Neck (Cartoon) |
|---|---|---|---|---|---|---|---|---|
| Happy | | | | | | | | |
| Sad | | | | | | | | |
| Surprised | | | | E34 | | | | |
| Fearful | | | | | | | | |
| Angry | | | | | | | | |
| Disgusted | | | | | | | | |
| Hatred | | | | | | | | |
| Awed | | | | | | | | |
| Happily_surprised | | | | | | | | |
| Happily_disgusted | | | | | | | | |
| Sadly fearful | | | | | | | | |
| Sadly angry | | | | | | | | |
| Sadly surprised | | | | | | | | |
| Sadly disgusted | | | | | | | | |
| Fearfully angry | | | | | | | | |
| Fearfully surprised | | | | | | | | |
| Fearfully disgusted | | | | | | | | |
| Angrily_surprised | | | | | | | | |
| Angrily_disgusted | | | | | | | | |
| Disgustedly_surprised | | | | | | | | |

Fig. 4B

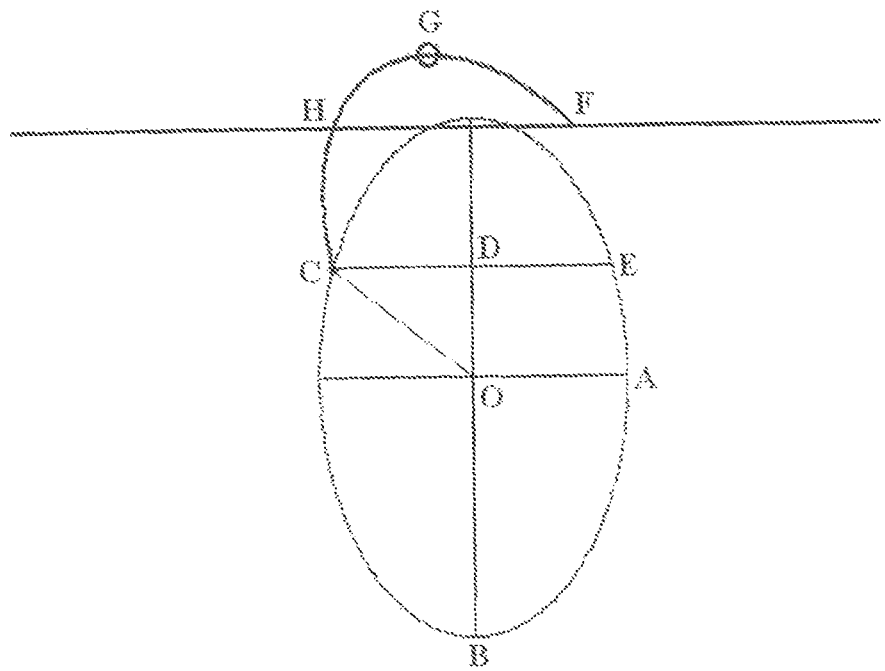
Skewed Elliptical Segment for Upper Eye Curve
The 4 independent variables are:
OB = major radius
OA = minor radius
Angle COD = Segment Angle
Angle FCE = Angle of Rotation
E34 = Curve CHGF + Curve BEC
which is a function of 6 variables
|  | Major Diameter | Minor Diameter | Major Diameter (2) | Minor Diameter (2) | Segment Angle | Rotation Angle |
|---|---|---|---|---|---|---|
| E34_Upper | 2500 | 1500 | 0 | 0 | 60 | -20 |
| E34_Lower | 2500 | 1500 | 2250 | 1800 | 30 | 0 |
Fig. 4-C Happy Sad Surprised

SYSTEM AND METHOD FOR MANIPULATING A FACIAL IMAGE AND A SYSTEM FOR ANIMATING A FACIAL IMAGE

TECHNICAL FIELD

The present invention relates to a system and method for manipulating a facial image, and particularly, although not exclusively, to a system for animating a facial image to speak a natural language.

BACKGROUND

Before the invention of the book, information was stored and past down through word of mouth, often referred to as the process of "story telling" from one generation to the next. However, with the invention of the printing press and paper, the paper bound book became and remains a common tool used to distribute literature for many centuries.

Although the technology in printing has changed, it is only recently that the book has found a competition in the delivery of literary works. Over the past decade, e-books have started to find appeal with many users by delivering digital versions of literary works for viewing by portable electronic devices.

In many instances, e-books operate by delivering printed materials in digital form to a reader. However, despite the advances in computing technology, these readers merely operate as a simple interface for displaying the digital version of the literary content. This has meant that apart from digitalizing literary content, little has changed from the methods of delivering literary content since the invention of the book.

SUMMARY OF THE INVENTION

In accordance with a first aspect of the present invention, there is provided a method for manipulating a facial image comprising the steps of:
  receiving a facial image of a subject;
  segmenting the facial image into one or more segments, wherein each of the one or more segments is associated with one or more facial features of the subject; and
  manipulating the one or more segments.

In an embodiment of the first aspect, the step of manipulating the facial image to generate the manipulated facial image of the subject includes a step of manipulating the one or more segments of the facial image based on simulated positions of the one or more segments associated with the pronunciation of a phoneme by the subject.

In an embodiment of the first aspect, the simulated positions of the one or more segments associated with the pronunciation of a phoneme by the subject are determined by processing a predetermined segment manipulation instruction associated with the phoneme.

In an embodiment of the first aspect, the predetermined segment manipulation instruction includes a Bezier method for quadratic and cubic function arranged to be applied to manipulate one or more points or curves of the one or more segment to generate the simulated positions of the one or more segments associated with the pronunciation of the phoneme by the subject.

In an embodiment of the first aspect, the step of manipulating the one or more segments further includes the step of patching the one or more segments.

In an embodiment of the first aspect, the step of patching the one or more segments includes rendering the segment with a segment colour and intensity based on a colour and intensity of one or more edges of the segment.

In an embodiment of the first aspect, the segment colour and intensity is determined based on an average of the colour and intensity of the one or more edges of the segment.

In an embodiment of the first aspect, the step of manipulating the one or more segments further includes a step of blending the one or more manipulated segment into the facial image.

In an embodiment of the first aspect, the one or more manipulated segments are blended onto a patched segment of the facial image.

In an embodiment of the first aspect, the step of blending the one or more manipulated segments onto a patched segment of the facial image includes rendering image portions between the edges of the manipulated segment and the edges of the patched segment with a portion colour and intensity based on the pixel colour and intensity of the edges of the manipulated segments and the patched segments.

In an embodiment of the first aspect, the portion colour and intensity is determined by processing the pixel colour and intensity of the edges of the manipulated segments and the patched segments.

In an embodiment of the first aspect, the portion colour and intensity of the edges of the manipulated segments and the patched segments is processed based on a facial characteristic.

In an embodiment of the first aspect, the step of manipulating the facial image to generate the manipulated facial image of the subject includes the step of manipulating the one or more segments of the facial image based on simulated positions of the one or more segments associated with a facial expression of the user.

In an embodiment of the first aspect, the step of manipulating the one or more segments of the facial image based on simulated positions of the one or more segments associated with a facial expression of the user includes:
  determining one or more segments affected by the facial expression of the user;
  determining one or more expression segment relationships each arranged to represent an adjustment of the segment based on the facial expression; and
  manipulating the one or more affected segments with the one or more expression segment relationships.

In an embodiment of the first aspect, the one or more facial segments are further manipulated based on the facial characteristics.

In accordance with a second aspect of the present invention, there is provided a system for manipulating a facial image comprising the steps of:
  a gateway arranged to receive a facial image of a subject;
  a segmentation module arranged to segment the facial image into one or more segments, wherein each of the one or more segments is associated with one or more facial features of the subject; and
  an image manipulation processor arranged to manipulate the one or more segments.

In an embodiment of the second aspect, the image manipulation processor is arranged to generate the manipulated facial image of the subject by manipulating the one or more segments of the facial image based on simulated positions of the one or more segments associated with the pronunciation of a phoneme by the subject.

In an embodiment of the second aspect, the simulated positions of the one or more segments associated with the pronunciation of a phoneme by the subject are determined by processing a predetermined segment manipulation instruction associated with the phoneme.

In an embodiment of the second aspect, the predetermined segment manipulation instruction includes a Bezier system for quadratic and cubic function arranged to be applied to manipulate one or more points or curves of the one or more segment to generate the simulated positions of the one or more segments associated with the pronunciation of the phoneme by the subject.

In an embodiment of the second aspect, the image manipulation processor is arranged to patch the one or more segments.

In an embodiment of the second aspect, the image manipulation processor is arranged to render the segment with a segment colour and intensity based on a colour and intensity of one or more edges of the segment to patch the one or more segments.

In an embodiment of the second aspect, the segment colour and intensity is determined based on an average of the colour and intensity of the one or more edges of the segment.

In an embodiment of the second aspect, the image manipulation processor is further arranged to blend the one or more manipulated segment into the facial image.

In an embodiment of the second aspect, the one or more manipulated segments are blended onto a patched segment of the facial image.

In an embodiment of the second aspect, wherein when the one or more manipulated segments are blended onto a patched segment of the facial image, image portions between the edges of the manipulated segment and the edges of the patched segment are rendered with a portion colour and intensity based on the pixel colour and intensity of the edges of the manipulated segments and the patched segments.

In an embodiment of the second aspect, the portion colour and intensity is determined by processing the pixel colour and intensity of the edges of the manipulated segments and the patched segments.

In an embodiment of the second aspect, the portion colour and intensity of the edges of the manipulated segments and the patched segments is processed based on a facial characteristic.

In an embodiment of the second aspect, the image manipulation processor is arranged to manipulate the one or more segments of the facial image based on simulated positions of the one or more segments associated with a facial expression of the user.

In an embodiment of the second aspect, the image manipulation processor includes:
  a decision routine arranged to determine one or more segments affected by the facial expression of the user;
  an expression function arranged to determine one or more expression segment relationships each arranged to represent an adjustment of the segment based on the facial expression; and
  a segment manipulation routine arranged to manipulate the one or more affected segments with the one or more expression segment relationships.

In an embodiment of the second aspect, the one or more facial segments are further manipulated based on the facial characteristics.

BRIEF DESCRIPTION OF THE DRAWINGS

Embodiments of the present invention will now be described, by way of example, with reference to the accompanying drawings in which:

FIG. 3C(i) is an illustration of a human facial image that has been processed by an example embodiment of a patching module;

FIG. 3C(ii) is a illustration of the mathematical relationship between the edges of an example patching image and a facial image;

FIG. 3D(i) is a diagram illustrating the operation of one embodiment of the draw blending function;

FIG. 3D(ii) is an illustration showing an individual segment having been drawn onto a facial image;

FIG. 4B is an example matrix of facial features and facial expressions;

FIG. 4C is an example of a skewed elliptical segment curve and function;

DETAILED DESCRIPTION OF THE PREFERRED EMBODIMENT

Figure 1:
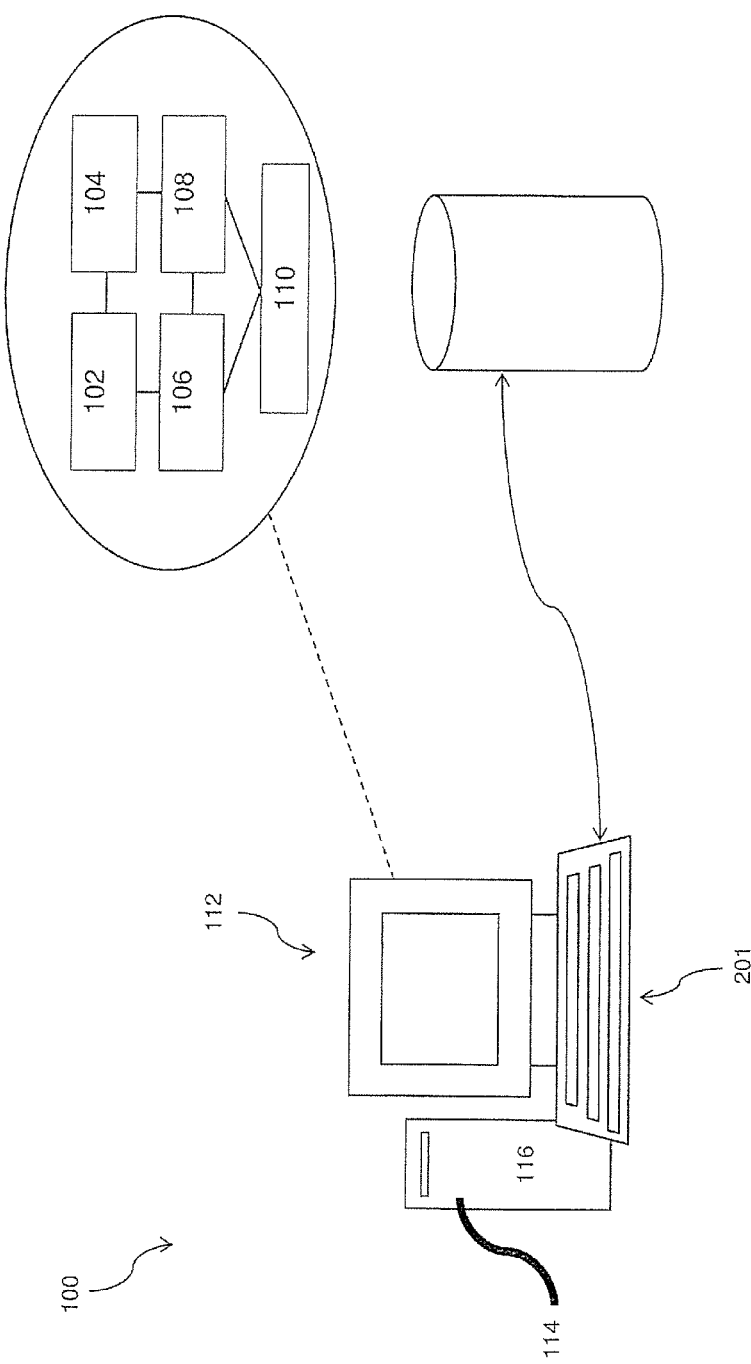
FIG. 1 is a schematic block diagram of a computer system which may be implemented with one embodiment of a system for manipulating a facial image and/or a system for animating a facial image.

With reference to FIG. 1, there is illustrated an embodiment of a computing device arranged to operate as a system for manipulating a facial image comprising:—a gateway arranged to receive a facial image of a subject;
  a segmentation module arranged to segment the facial image into one or more segments each associated with one or more facial features of the subject; and—an image manipulation processor arranged to manipulate the one or more segments.

In this embodiment, the computing device is implemented or otherwise arranged to operate as a system for manipulating a facial image. The computing device may be programmed with software or arranged with hardware so as to receive a facial image of a subject and manipulate the facial image in accordance with one or more image manipulation functions to generate a manipulated facial image. In turn, this manipulated facial image may be displayed, stored, transmitted or further processed by an animation engine so as to generate an animation of this facial image. In some example embodiments, the system may be arranged to manipulate and/or animate one or more images of a face of a person speaking a particular language or pronouncing a particular word. In other examples, the system may be arranged to manipulate the facial image of a person or object so as to simulate a different facial expression and/or attributes or characteristics of the person or object. In yet other example embodiments, the system is arranged to animate the face of a person speaking a particular language, whilst also factoring in the person's facial expression and/or facial characteristics when producing the animation.

As shown in FIG. 1, the computing device may be a computer or computing device that is implemented by any computing architecture, including stand-alone PC, client/server architecture, "dumb" terminal/mainframe architecture, or any other appropriate architecture. The computing device may also be appropriately programmed to implement the invention. The computing device as shown, comprises a computer 100. The computer 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The computer 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The computer 100 may also include storage devices such as a disk drive 108 which may encompass solid state drives, hard disk drives, optical drives or magnetic tape drives. The computer 100 may use a single disk drive or multiple disk drives. The computer 100 may also have a suitable operating system 116 which resides on the disk drive or in the ROM of the server 100.

The system may also have a database 120 residing on a disk or other storage device which is arranged to store various data or information necessary to operate the system for animating a facial image. The database 120 may also be in communication with an interface 202, which is implemented by computer software residing on the computer 100.

Figure 2:
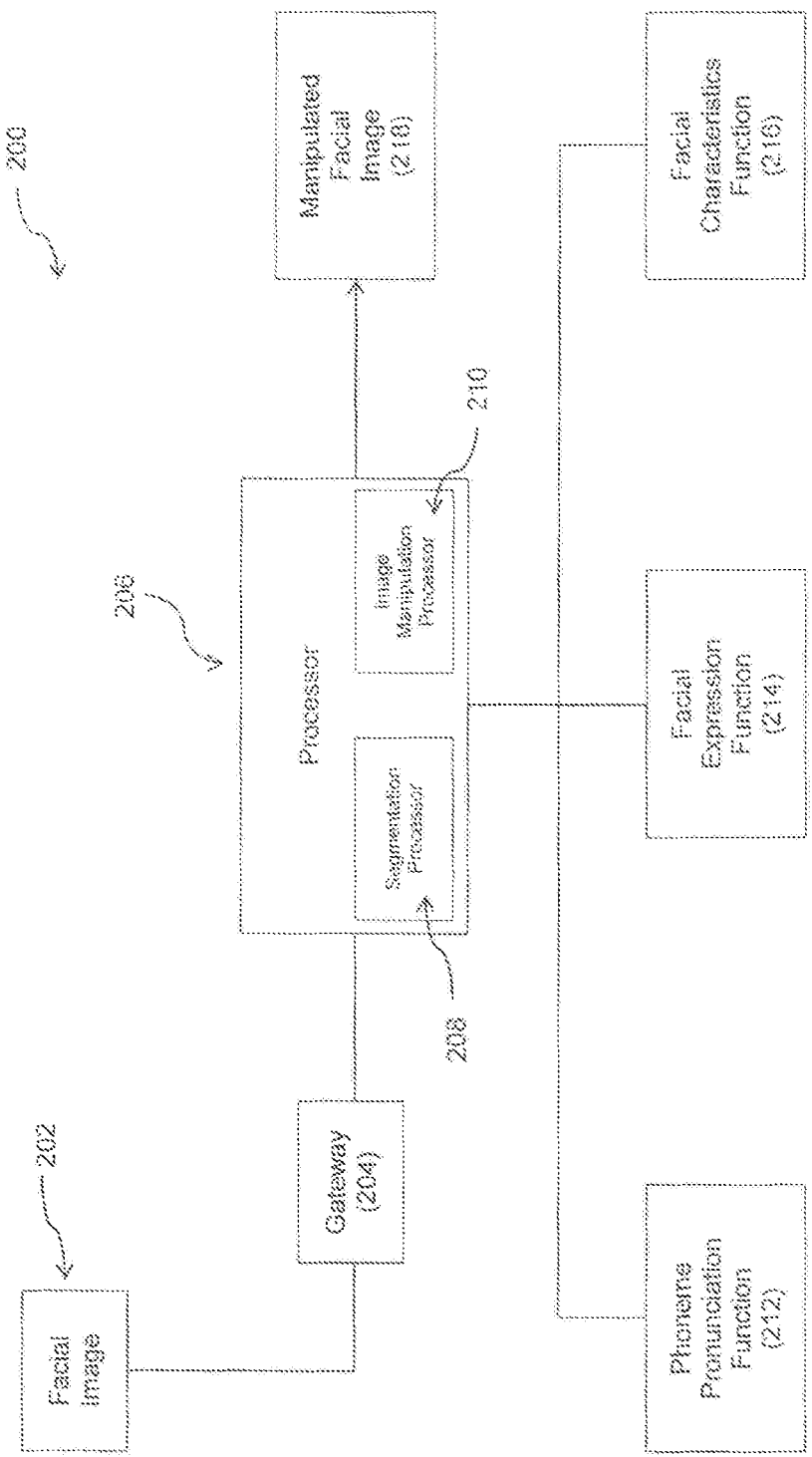
FIG. 2 is a block diagram of one embodiment of a system for manipulating a facial image.

With reference to FIG. 2, there is illustrated a block diagram of an embodiment of a system for manipulating a facial image 200 comprising: a gateway 204 arranged to receive a facial image of a subject; a segmentation module 208 arranged to segment the facial image into one or more segments each associated with one or more facial features of the subject; and an imagine manipulation processor 210 arranged to manipulate the one or more segments.

In this embodiment, the system 200 includes a gateway, a segmentation module 208 and an image manipulating processor 210 which may be implemented, at least partially, on one or more computers or computing devices such as those as shown in FIG. 1. Together, these components, 204, 206, 208, 210 are arranged to receive a facial image of a subject 202 and process this facial image 202 so as to manipulate the facial image 202 in response to a desired manipulation function (212, 214, 216) as required by the user. In turn, these components 204, 206, 208, 210 are arranged to create a manipulated facial image 218. This manipulated facial image 218 may also be shown on a display, stored in memory or storage, transmitted via a communication network or further processed by an animation engine to form part of an animation sequence.

As shown in this example, the gateway 204 is arranged to receive a facial image 202 from a user of the system. This could be, for example, an image file in any suitable format (e.g. JPEG, PGP, BMP) of a facial representation of a particular subject (e.g. a head and neck photo of a person). It is important to note that the facial image 202 may be a photo or image file of a person's face, but may also include images of objects, animals, or any pieces of article or art work. The term "facial", includes one or more faces and/or facades of any person, animal, article or object. It is intended that the term "facial" may also include any abstract understanding of any object, article or artwork that can function as a face, façade, front or representation. This would mean any façade or portion of a building, a vehicle or any other inanimate object that could be humanized or be otherwise represented as a "face" or otherwise be the subject of anthropomorphism, or personification could also be included in a facial image.

Once the gateway 204 receives the facial image 202, the image 202 is then transmitted to the processor 206 where the facial image is manipulated so as to generate a manipulated facial image 218. This manipulated facial image 218 may be based on the original received facial image 202, but may have had one or more portions of the facial image 202 having been manipulated based on a desired image manipulation function 212, 214, 216. In turn, this manipulated facial image 218 may form a frame or a portion of an animation sequence.

The processor 206 may also include a number of facial manipulation functions 212, 214, 216 which may be executed so as to manipulate the facial image as desired. As shown in FIG. 2, these facial manipulation functions may include;

a phoneme pronunciation function 212 arranged to manipulate the facial image so as to model the facial expression of the face of the subject in pronouncing a particular phoneme being spoken by the subject. A phoneme is a basic unit of a language's phonology and thus each word spoken by a user of any language can be broken down into one or more phonemes;

a facial expression function 214 arranged to manipulate the facial image based on the facial expression of the subject. These facial expressions may include, without limitations, happiness, sadness, anger, frustration, surprise, indifference, eagerness, boredom, tiredness, alertness, pain or any other emotion, feeling or senses that can be shown through facial expression; and a facial characteristic function 216 arranged to manipulate the facial image based on the facial characteristics of the subject. These facial characteristics may include, for example, wrinkles, freckles, imperfections, effects of aging, skin burns, dimples, stretching or tightening of skin and muscle contours due to weight gain or loss.

The processor 206 may execute one or more of these facial manipulation functions 212, 214, 216 as required. In an example embodiment, the processor 206 may be arranged to only execute the phoneme pronunciation function 212 so as to animate the face of the subject to pronounce a particular phoneme. This is advantageous when the subject is emotionless, or only express a single emotion, for example.

However, at times, the facial expression function 214 may also be arranged to be executed in combination with the phoneme pronunciation function 212 so as to simulate the facial expression of the subject when the phoneme is pronounced. In turn, this allows the animation of a phoneme pronunciation to include a facial expression factor, making the animation more lively and realistic. In yet another embodiment, the processor 206 may combined the phoneme pronunciation function 212, the facial expression function 214 and the facial characteristic function 216 so as to generate an animation which includes a phoneme pronunciation, a facial expression as well as the facial characteristic of the subject.

As mentioned above, the processor 206 is also arranged to individually process each of the functions 212, 214, 216 as desired. Thus as an example, the facial expression function 214 or the facial characteristics function 216 may each or in combination, be executed without the phoneme pronunciation function 212. The result of this example would be that the system for manipulating a facial image 200 may be arranged to simulate a facial expression of a subject by manipulating the facial image 202 received by the gateway 204 based on the desired facial expression to be simulated, and/or, simulate the facial characteristics of a subject by manipulating the facial image as instructed.

Once the processor 206 executes one or more facial manipulation functions 212, 214, 216, the facial image 202 would in turn be manipulated to form a manipulated facial image 218. This manipulated facial image 218 may be an alteration of the original facial image 202 received by the gateway 204. In turn, this manipulated facial image 218 may then be shown individually as a single manipulated facial image, stored into memory/storage, transmitted via a communication network or further processed by an animation engine to form a single animation frame which can in turn be combined with other manipulated facial images so as to create an animation sequence of a subject's face.

Preferably, as shown in FIG. 2, the processor 206 may include a segmentation module 208 which is arranged to operate with the image manipulation processor 210. The segmentation module 208 is arranged to segment the facial image 202 into multiple segments with each segment being associated with a particular facial feature of the subject. In turn, these segments may then be processed by the image manipulation processor 210 which is arranged to manipulate each of these segments as required by each facial manipulation function 212, 214, 216. In one example, the segments of each facial feature allows for an easier manipulation of the facial image since each manipulation function 212, 214, 216 may manipulate a particular segment as required. The operation of the segmentation module 208 with the image manipulation processor 210 is further described below with reference to FIGS. 3A to 4A.

Figure 3A:
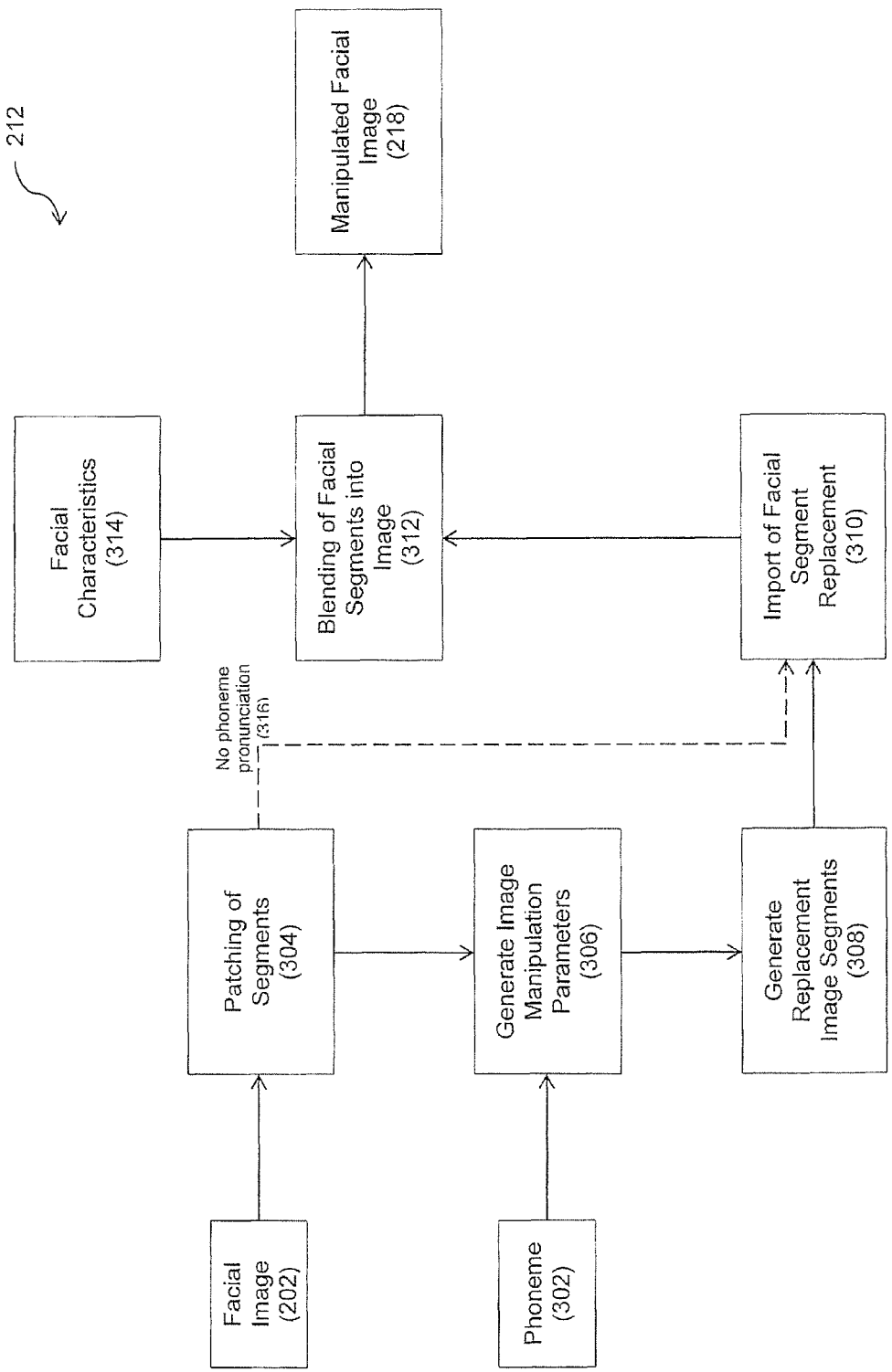
FIG. 3A is a flow diagram of an example phoneme pronunciation function and facial characteristic function as executed by the processor of FIG. 1.

With reference to FIG. 3A, there is shown an embodiment of the phoneme pronunciation function 212 which is arranged to be executed by the image manipulation processor 210 so as to form a manipulated facial image 218 showing the face within the image in pronouncing a phoneme 320. Furthermore, the facial characteristic function 216, arranged to manipulate the facial image based on the facial characteristic 314 of the subject of the facial image 202, is also shown in FIG. 3A to operate with the phoneme pronunciation function 212, or individually without the phoneme pronunciation function 212.

Figure 3B:
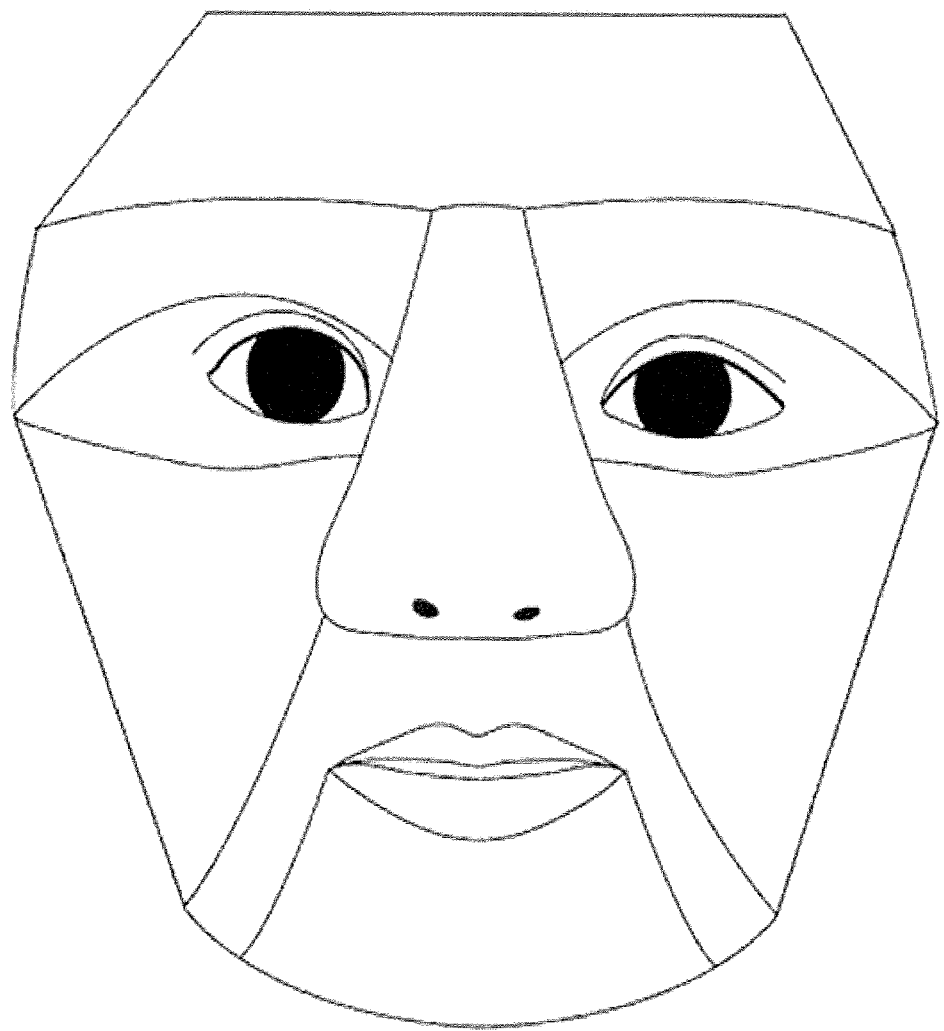
FIG. 3B is an example of the segmentation of an individual facial image.

As shown, once the facial image 202 is received by the gateway 204 and delivered to the processor 206 for processing, the segmentation module 208 is firstly arranged to segment the facial image into multiple segments (304). The purpose of these multiple segments is to allow the image manipulation functions 212, 214, 216 to manipulate only the segments which are affected by the image manipulation function, such as by the phoneme pronunciation function 212. This in turn may increase the speed of the manipulation process as only the segments which are required to be manipulated are processed whilst leaving the unaffected segments alone so as to minimize processing resources used. As shown in FIG. 3B, an example of a human face can be segmented into 13 segments, including forehead (1), eye brows (2,4), eyes (5,6), nose ridge (3), cheek (7,8), chin (13), upper lip (10), lower lip (12) and mouth aperture (11), although as a person skilled in the art would appreciate, further or different segments may be formed as appropriated based on the facial features of the subject or if a higher resolution of manipulation is desired.

Once the facial image 202 has been segmented by the segmentation module 208, the segments which will be manipulated is firstly determined based on a query with a segment database which includes a listing of each phoneme 302 and its associated segments of a subjects face that will be manipulated to simulate the pronunciation of that particular phoneme. Each of the segments that will be affected by the pronunciation of the phoneme is firstly patched (304) so as to prepare a space within the segment for the importation of a replacement segment. Effectively, this patching process (304) is to prepare the facial image segment such that the replacement facial image segment will blend into the facial image so as to minimize the appearance of the change or alteration of the image. As shown in FIG. 3C, in order to patch each of the segment, a mathematical representation, such as a mathematical function of a curve representative of the borders of a particular segment is firstly determined.

After this mathematical definition of the border is determined, for each pixel or cluster of pixels within this border, each pixel or cluster of pixels are drawn over by a pixel colour and intensity relative to the pixel colour and intensity at its nearest surrounding edges. This surrounding edge, being the borders of the segment being patched and having already been defined earlier as a mathematic curve, can then be located by the processor with this mathematic curve so as to determine the areas of the segment which are to be drawn over with pixel colours or intensity relative to its nearest edge. In one example, as shown in FIG. 3C(i), an averaging of the colour and intensity of each pixel, relative from the extremes found on the pixels of the two surrounding curves are applied, and thus allowing a gradual change in colour and intensity from a first curve to the next curve whilst erasing the original segment as shown in FIG. 3C(ii).

In turn, this method of patching the segment minimizes the change in colours between two surrounding curves. This allows a segment to be effectively patched and subsequently replaced with a new segment whilst minimizing the colour or intensity disruptions that would have been created if this patching process was not executed by the image manipulation processor 210.

Once the affected segments have been patched (304), the segments which are to be manipulated are then selected and processed for manipulation (306). In this regard, the phoneme 302 which is being pronounced is then processed so as to select the necessary segments that will be affected to simulate the pronunciation of the phoneme (306). To start this process, the processor 206 is arranged to perform a query on a database or look up table which has a set of manipulation parameters for each segment of a facial image (306). These manipulation parameters are associated with each phoneme 302 of any language which is being pronounced. Thus once the processor 206 has the phoneme 302 it is to pronounce, a set of manipulation parameters for each segment can be retrieved from the database (306). Preferably, these parameters may include a set of values which can exist as a mathematical (e.g. cubic, quadratic or Bezier) function to change the shape of each segment. As an example, the upper and lower lip segments may change shape in accordance with a specific phoneme being pronounced and thus each of these segments are processed in accordance with a mathematical function that may shift up or down, widen, shrink or bend each of these segments as required.

In some example embodiments, these manipulation parameters stored within the database may be based on a standard facial topology and thus may be created from a best fit or average of many facial data collected from various different faces that are being manipulated when speaking specific phonemes. Accordingly, in some other embodiments, these manipulation parameters once retrieved from the database may be further processed based on the characteristics of the facial features that are being manipulated.

This further processing may include an adjustment of these manipulation parameters based on the characteristics of the facial features that are being manipulated. As an example, if the subject's lips are thicker than the lips of those found in the standard topology, the further processing may append a weighting to the manipulation parameters so as to accommodate for the manipulation of an extra thick set of lips. Comparisons of the subject's facial feature with the standard topology may also be undertaken by this further processing so as to identify the adjustments which can be applied to these manipulation parameters. For practical reasons (e.g. minimum user input) only one photo is requested for the generation of a set of images modelling the pronunciation of each phoneme. In some examples, as the standard facial topology is taken from a professional to provide the correct mouth movements. In one example, to take account of the difference between the user and the professional, the whole standard set has to undergo geometrical adjustments by observing the difference between the at-rest photo of the user and that of the professional. Taking the mouth as an example, the following "Mouth Attributes" are defined to characterize an individual mouth:

Overall_Width
   Upper_Ht
   Peak_Thick
   Valley_Thick
   Peak_to_Peak
   Upper_AvThick
   LowHt
   LowThick
   LowAv
   LefPeak
   RitPeak
   Valley
   XDrop
   YDrop This simple vector makes linear correction possible for the pronunciation group. In other words, if the user has thinner upper lip, the professional's counterpart should be thinner proportionally whether the pronunciation is "e" or "u".

Once these parameters are determined by querying the database or by further processing based on the characteristics of the facial features, a replacement segment image is generated based on these parameters (306). Effectively, the segment which needs to be manipulated is then changed or adjusted based on the parameters determined previously. Such a manipulation of the segment can be performed by applying the necessary change parameters (mathematical functions or the like) to the segment image itself so as to form a replacement image segment (308).

Once the replacement image segments are formed (308), each of these segments is then amended into the original facial image so as to replace their corresponding segment on the original facial image (310). As each of the corresponding segments has been previously patched so as to receive the replacement segment, when the replacement image segment is amended into the facial image 202, there should be no existing image on the facial image that would alter the appearance of the replacement segment. However, the colours of the replacement segment may not necessarily blend well within the patched segment as each replacement segments may have a starting edge colour which is different to that of the patch segment.

In order to address this problem, when each replacement segment is amended into the facial image, a draw blending function (312) is performed by determining the colours and intensity of each pixel between the edges of the replacement segment and the edges of the patched segment and in turn, using these colours and intensity to determine the colours and intensity of the pixels in between the edges. Preferably, as shown in FIG. 3D(i), the draw blending function (312) is arranged to draw the pixels in between the edges of the replacement segment and the edges of the patched segment with a determined colour and intensity based on a linear average between the colours and intensity of the pixels found on the edges of the replacement segment and the patched segment. As shown in FIG. 3D(ii), the mouth segments of the human face is then drawn over the patched segments of the human face as shown in FIG. 3C(ii) so as to show a facial image of the human face pronouncing a particular phoneme. After this mouth segment is drawn over the patched segments, the draw blending function (312) is then performed such that each pixel between the edge of the mouth segment and the existing patched facial segment is then blended to minimize disruptions to the colours and intensity of the facial image after the mouth segment has been imported.

However, in certain situations, this draw blending function (312) may not necessarily operate with a linear average, instead, depending on the individual facial characteristic 314 as provided, a different draw blending function (312) that may be non linear may also be applied so as to simulate specific facial characteristics in the subject.

As an example, instead of the linear averaging function described above with reference to FIG. 3D(i), a hyperbolic sine function may be used around the cheek segments to simulate the appearance of glabellas wrinkles in between the replacement image segment and the patched segment. Similarly, in order to simulate the presence of flabby cheeks, a cosine function can be used to draw the edges of the replacement image segment into the patched segment. Thus depending on a determined facial characteristic, a query can be made to a database to retrieve an appropriate function so as to simulate these facial characteristics 314.

As shown in FIG. 3A, the draw blending function (312) may also be invoked without the necessity of manipulating individual segments for the pronunciation of phonemes or for any other reason. As shown, once the facial image 202 has been segmented by the segmentation module 208 and patched (304), each segments can simply be redrawn onto the facial image with the draw blending function (310), (312) as described above based on an inputted facial characteristic 314.

Figure 4A:
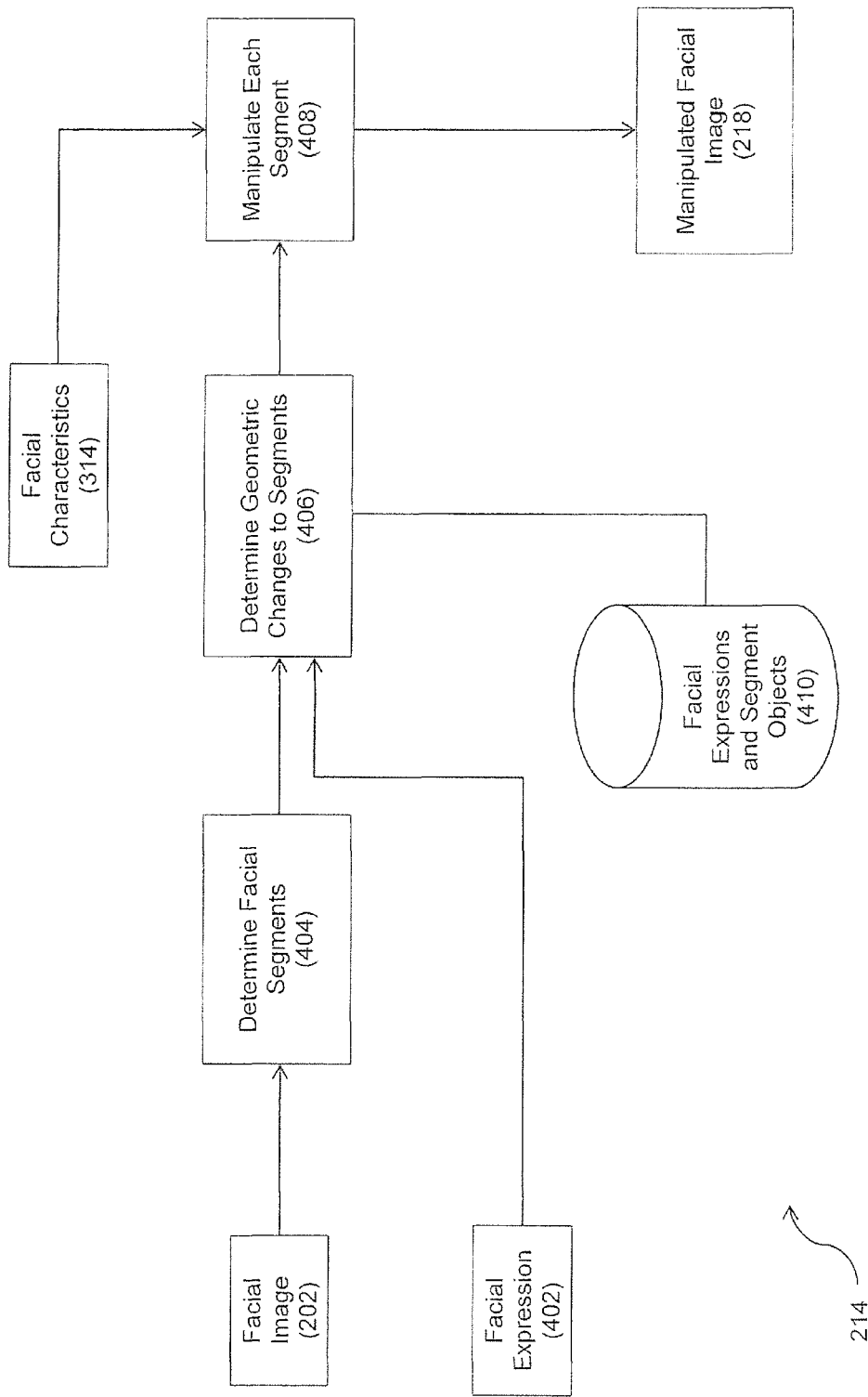
FIG. 4A is a block diagram illustrating the operation of a facial expression function of a system for manipulating a facial image of FIG. 2.

With reference to FIG. 4A, there is shown an embodiment of a facial expression function 214 which is used by the processor 206 to manipulate a facial image 202 to model an input facial expression 402. In this example once the facial image of a subject is imported into the gateway 204 and delivered to the processor 206 for processing, the facial expression data is also submitted so as to modify the facial image 202 to show the facial expressions 402 which have been provided. As mentioned above, these facial expressions 402 may include without limitations, happiness, sadness, anger, frustration, surprise in different eagerness, boredom, tireless, alertness, pain or any other emotion feeling or senses that can be shown through a facial expression 402.

Once the facial image 202 has been received and a facial expression provided, the segmentation module 208 is arranged to segment the facial image 202 into multiple segments (404). In a similar manner to the segmentation module 208 as illustrated with reference to FIG. 3A, the segmentation module 208 is arranged to segment the facial image 202 into multiple segments each associated with a facial feature of the subject. In addition to the thirteen segments which were mentioned with reference to FIGS. 3A and 3B, in this particular example embodiment, the specific segmentation module 208 is arranged to segment the facial features into sixteen items including: forehead, eyebrows, eyelids, eyes, eyeballs, eye bags, nose, cheeks, dimples, upper lip, lower lip, tongue, chin, ears, hair and neck. Once the segmentation module 208 has segmented the facial image into these sixteen segments, the segmentation function is arranged to instruct the processor 206 to determine the geometric change to each of the segments in view of the facial expression (406).

In this example, a facial geometric change function (406) is firstly arranged to query a database 410 or table outlining the adjustments which must be made to each facial feature based on a particular expression. This database can exist in the form of a matrix which in one example includes a column of facial features against rows of facial expressions with each element in this matrix having specific parameters on adjustment values for manipulating the individual segments in reflection of the facial expression for this particular facial feature. An example of such a matrix is illustrated in FIG. 4B together with a list of sixteen facial features and thus in this example there are a total of 20×15=320 matrix elements of which each would include a set of graphical parameters or objects which can be used by the geometric change function to manipulate the segment reflective of each facial feature.

With reference to FIGS. 4A and 4C, the manipulation of each segment (408) may include the utilization of individual mathematical functions which modify the curve, shape or dimensions of an individual segment in view of the facial expression. As an example shown in FIG. 4C, an eyebrow as well as eye segment may be modified with a specific skewed elliptical curve by adjusting the dimensions of each of the curved portions of the eyebrow and eye segment with respect of a segment angle and rotation angle by a predetermined dimensional parameter.

Preferably, each of these parameters is used to determine the manner in which the individual segment is to be manipulated (408). Once these parameters are obtained (406) from the database 410, the parameters are used such that the individual image of each segment is then manipulated based on the facial expression for its associated facial feature. In this database 410, it is expected that there are multiple mathematical functions depending on individual facial expressions and for each of the facial features corresponding each segments and in the process, each of these functions can then be applied to each graphical segment to be manipulated.

Figure 4D:
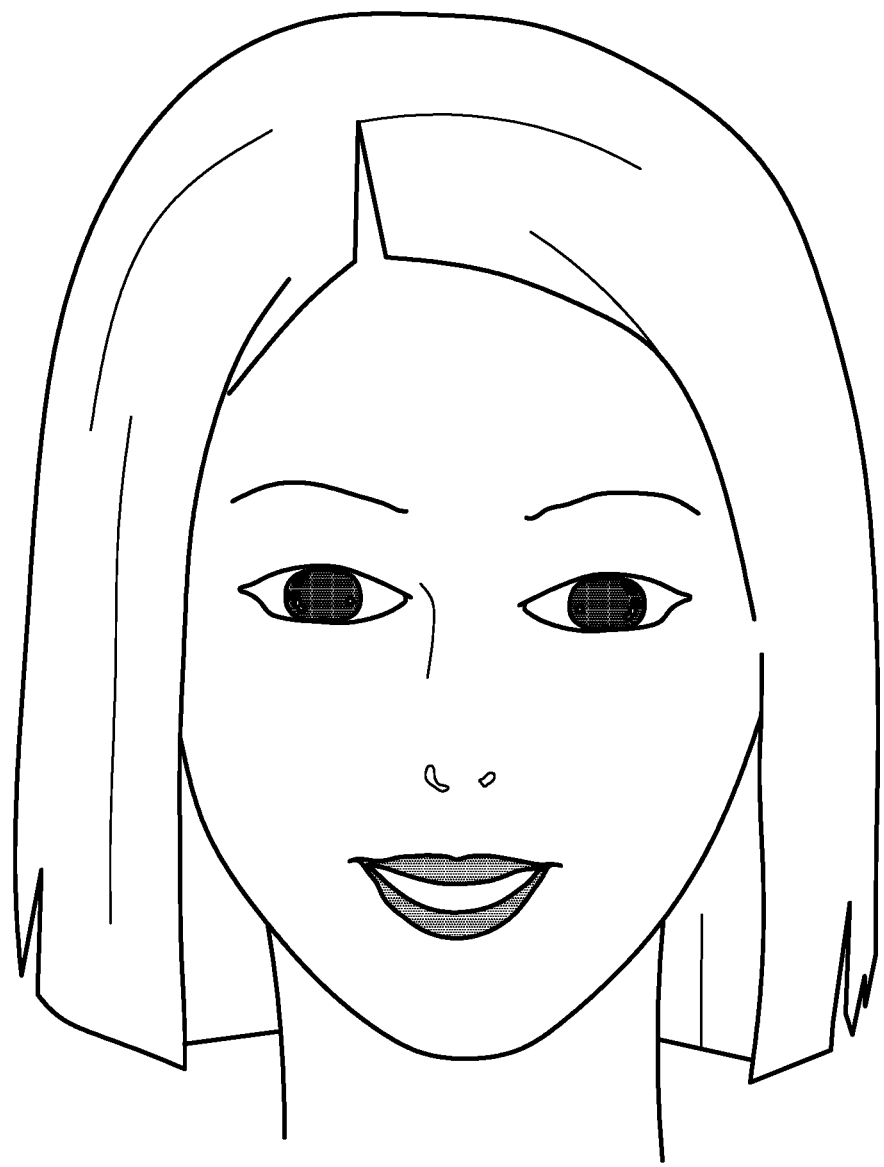
FIG. 4D is an illustration of a facial image that has been manipulated by the facial expression function.
Figure 4E:
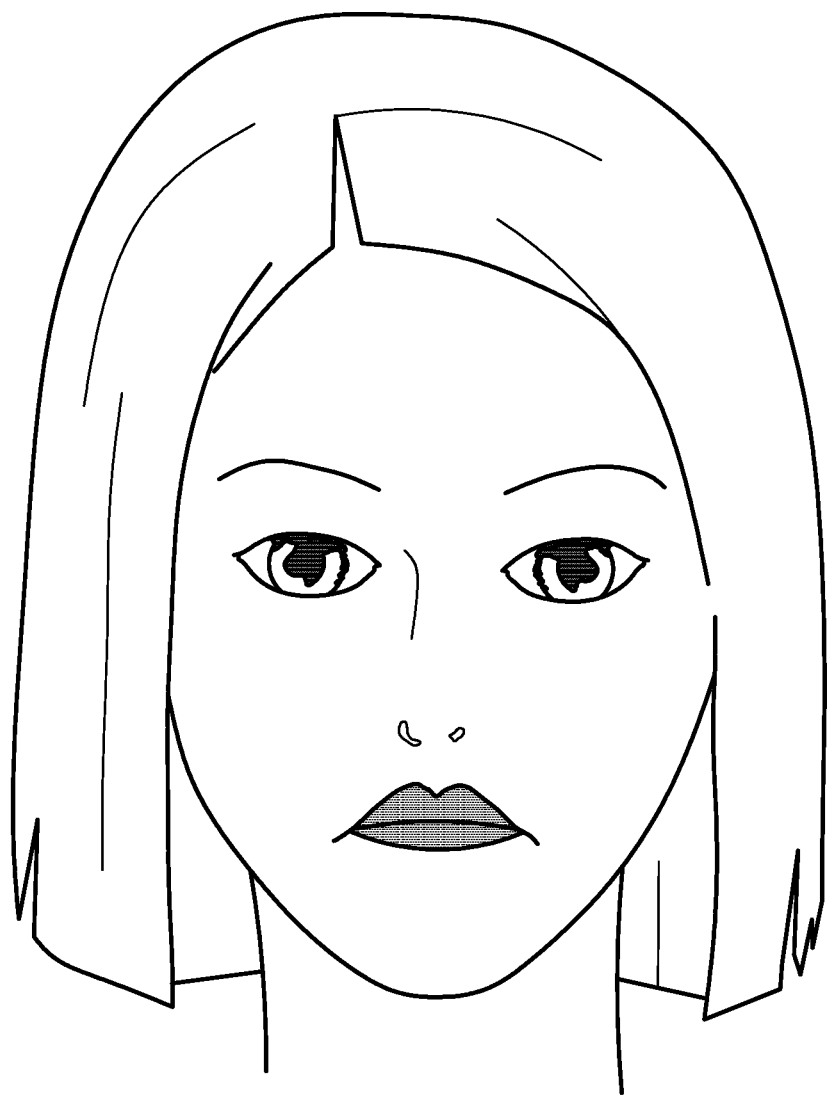
FIG. 4E is an illustration of a facial image that has been manipulated by the facial expression function.
Figure 4F:
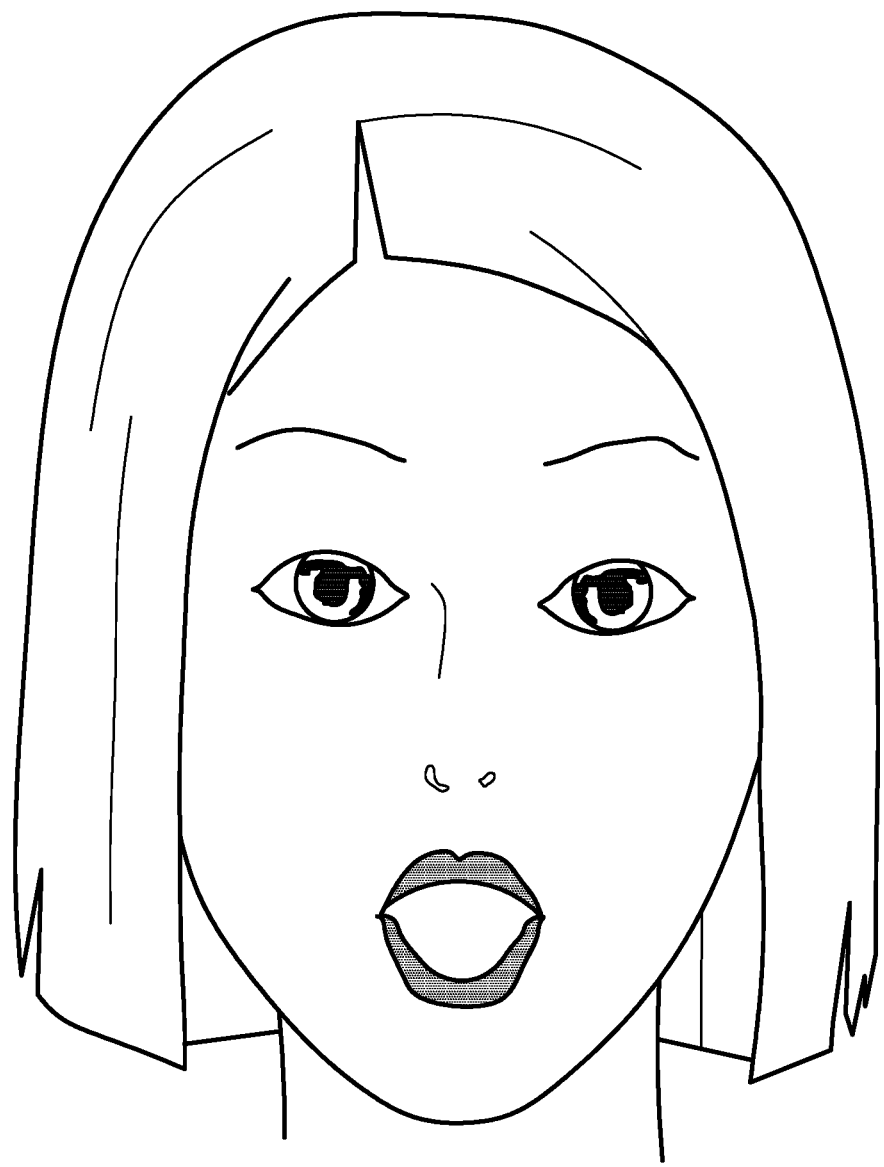
FIG. 4F is an illustration of a facial image that has been manipulated by the facial expression function.

As shown in FIGS. 4D, 4E and 4F, various facial expressions can be simulated by manipulating individual segments of a facial image by applying individual mathematical functions relating to each facial feature based on the facial expression desired to be modelled.

In the embodiment described, it may also be possible that each element within the database be stored as parameters alone or as individual graphical objects which have been previously manipulated and stored in a graphical objects library. In these examples, by using a graphical object that has been previously manipulated, the system is able to import a facial image via the gateway and invoke, a pre-processing routine to firstly create individual graphical objects for each of the facial expressions and each of the facial features. In these examples, individual graphical objects are thus pre-processed and generated by the use of these routines for each of the matrix members and in turn, allows these objects to be simply imported when manipulating the facial image. This embodiment is advantageous should speed be a necessary requirement to produce a facial image. Examples of such applications may include video or animation streaming or large volume of facial images for manipulation in real time.

Also shown in FIG. 4A is that the facial characteristics 314 may also be imported into the routine arranged to manipulate each of the segments (408). As previously described with reference to FIG. 3A, when individual segments are replaced into the facial image, the edges of each facial image and the original image may be manipulated so as to blend the replacement segment into the original facial image. As described above with reference to FIG. 3A, individual facial characteristics can also be simulated based on the usage of a different drawn blending function depending on desired facial characteristics which are to be simulated.

Figure 5:
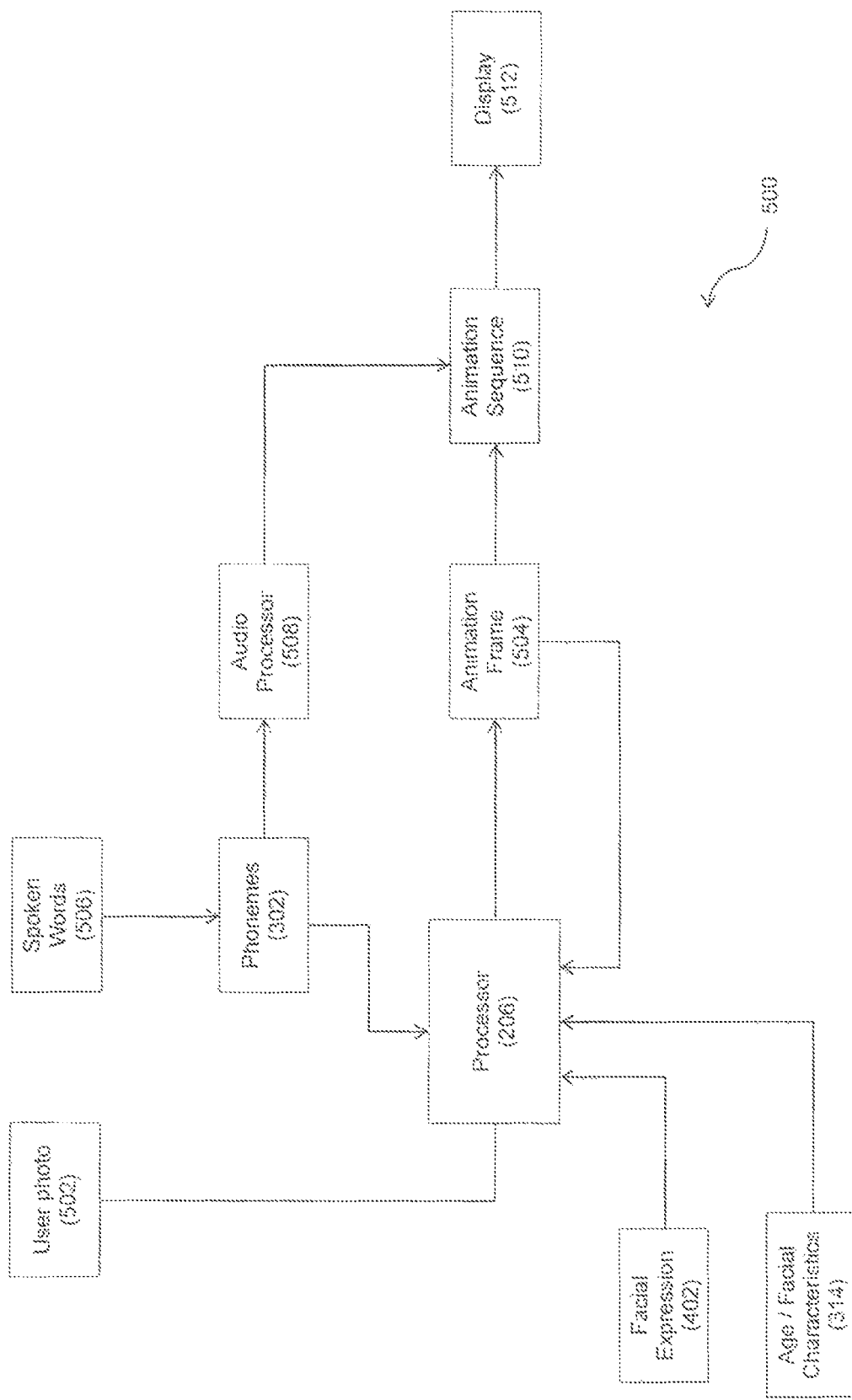
FIG. 5 is a block diagram of an example system for animating a facial image.

With reference to FIG. 5, there is illustrated an embodiment of a system for animating a facial image 500 comprising a gateway (not shown) arranged to receive a facial image, an image processor 206 arranged to manipulate the subject facial image and an audio processor 508 arranged to synthesize a sound or utterance for combining with one or more animation frames 504 so as to create an animation sequence 510. In this embodiment, the image processor 206 is arranged to operate with various functions or routines including the facial expression function 214, the facial characteristic function 216 and the phoneme pronunciation function 212 previously described with reference to FIGS. 2 to 4F.

In this embodiment, the system 500 is arranged to operate as an animation engine or system to produce an animation sequence 510 of a user pronouncing a series of sounds which are broken down into individual phoneme and in the process provided to an audio processor with the phoneme to synthesize the individual phoneme in the form of a sound. Simultaneously, the image processor 206 is also arranged to manipulate the facial image to simulate the pronunciation of each phoneme whilst also allowing the individual facial expressions to be used to manipulate the facial image.

In addition, the facial characteristic function 216 described above is also used to simulate any particular facial characteristic of an individual subject. Once each of these image manipulation functions 212, 214, 216 are necessarily invoked by the processor 206 and an individual frame consisting of the manipulated facial image 504 is then compiled by the system 500, the complied facial images is then combined and integrated with the audio output from the audio processor 508. In turn, the compilation of facial images 504 together with the audio output forms an animation sequence 510. This animation sequence can then be displayed 512, stored, transmitted or further processed so as to animate a user either pronouncing a series of words or showing a particular facial expression or showing a particular facial characteristics or any combination of one or more of the above.

Figure 6:
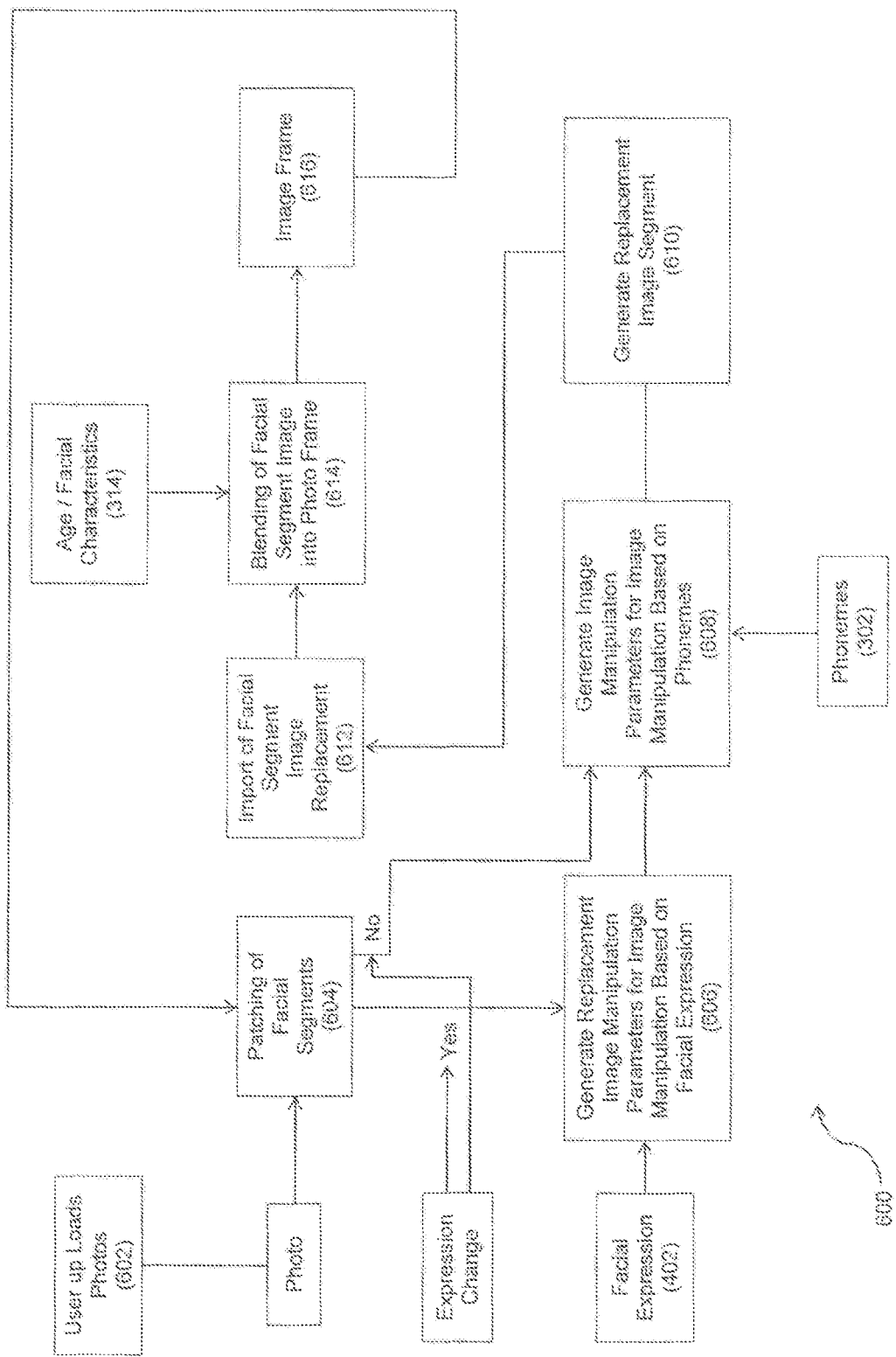
FIG. 6 is a flow diagram of a system for animating a facial image in accordance with FIG. 5.

With reference to FIG. 6, there is illustrated another embodiment of the system for producing an animation sequence 600. As shown in this flow diagram, a user can firstly upload their photograph, image or cartoon as an individual facial image (602). Once this photograph or facial image is provided to the gateway, the image is segmented into multiple segments. Each of these segments is then patched as described above if it is determined that the segment will be manipulated by a subsequent image manipulation function (604).

Following these steps is a step whereby if there is determined to be a facial expression change, then the individual facial expressions 402 are provided so as to manipulate each of the relevant segments to reflect this particular facial expression (606). After the perimeters are generated, they may be combined with image perimeters which also have been determined based on the phoneme 302 which is to be pronounced (608). As mentioned above with reference to FIG. 3A, a mathematical relationship is firstly determined based on the phoneme 302 which is to be pronounced. These individual perimeters are then combined such that a manipulation of the image can take place to include both the facial expression and the phoneme which has been selected for pronunciation (608).

After these individual perimeters are generated, the perimeters are then applied to manipulate the facial image segment (610). The segments are then imported and replaced into the original facial image (612). A drawn blending function (614) may then be invoked to ensure that the individual segments can be blended into the original facial image. At this stage depending on the facial characteristics 314 selected additional functions of the drawn blending function can then be applied such that the segments can be drawn into the original facial image to include any desired facial characteristics 314.

Once completed, a manipulated facial image is then produced (616) and may form an individual frame of an animation sequence relating to a user's expression, characteristic or pronunciation of a phoneme. Once combined with any necessary audio track as shown in FIG. 5, an animation sequence can then be produced based on a combination of multiple manipulated facial images.

Figure 7:
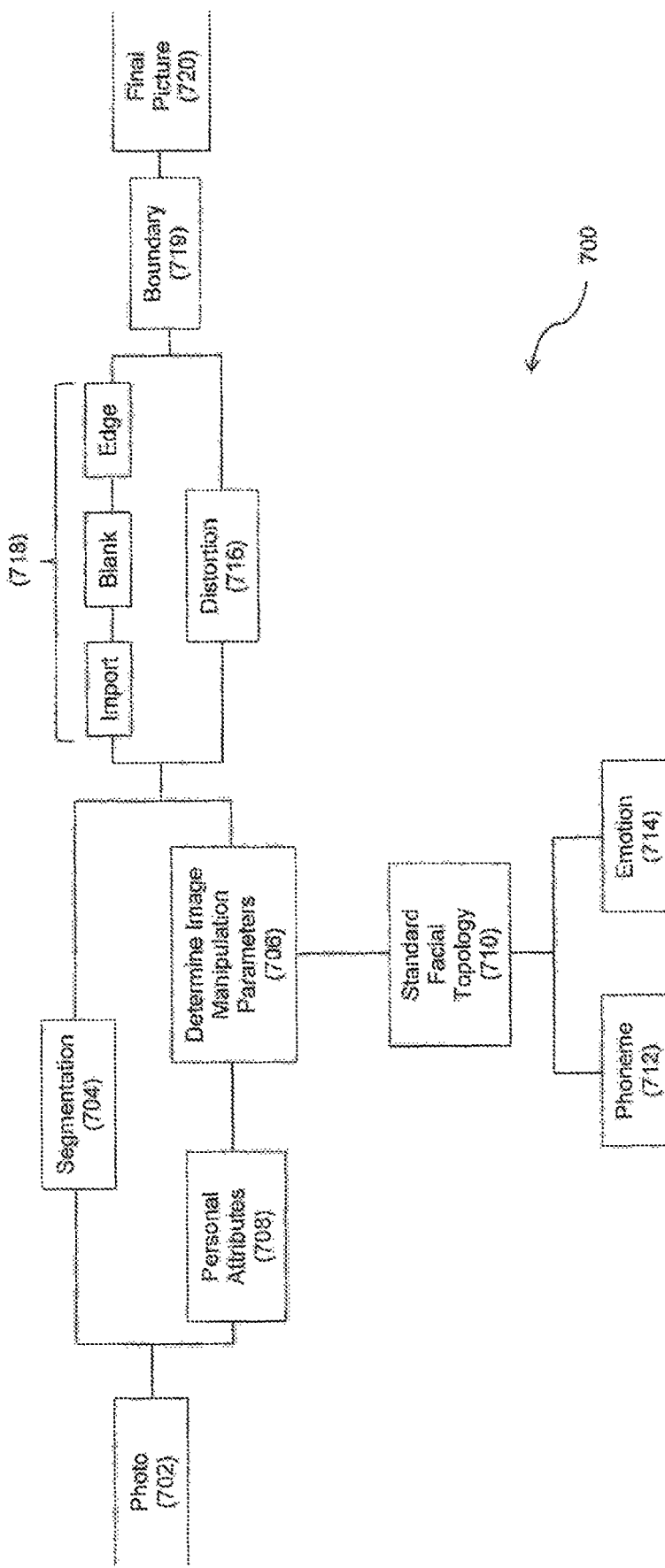
FIG. 7 is a flow diagram of a system for animating a facial image in accordance with another embodiment.
Figure 8A:
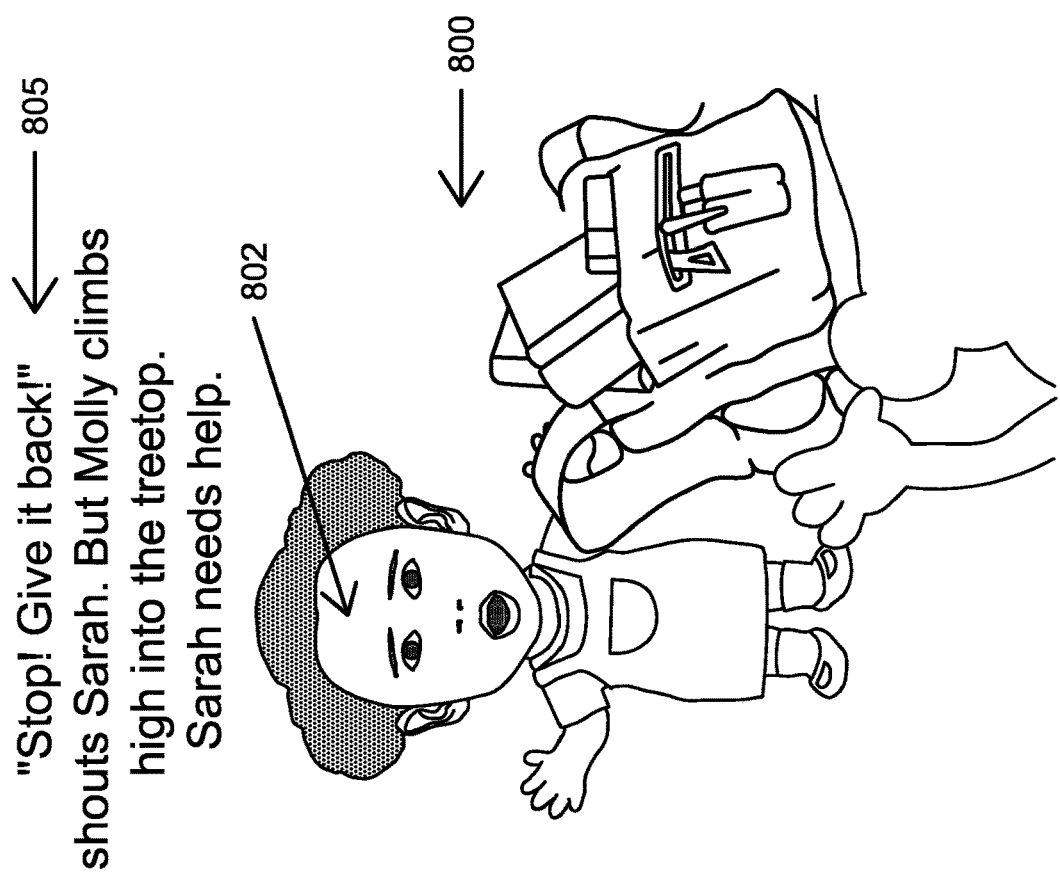
FIG. 8A is an example screenshot of an example electronic publication generated with the system for manipulating a facial image.
Figure 8B:
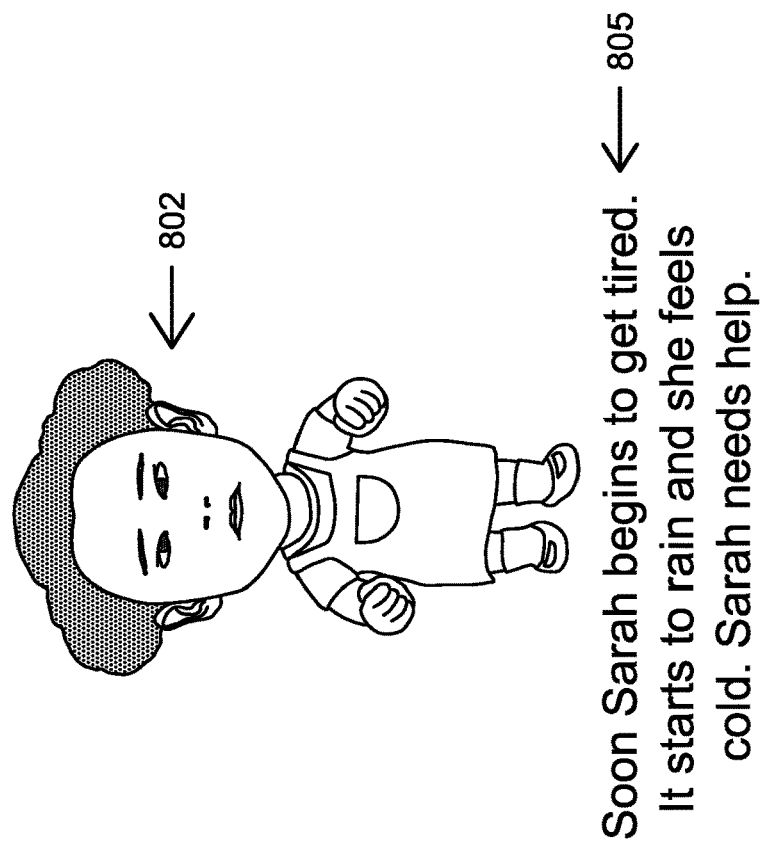
FIG. 8B is an example screenshot of an example electronic publication generated with the system for manipulating a facial image.
Figure 8D:
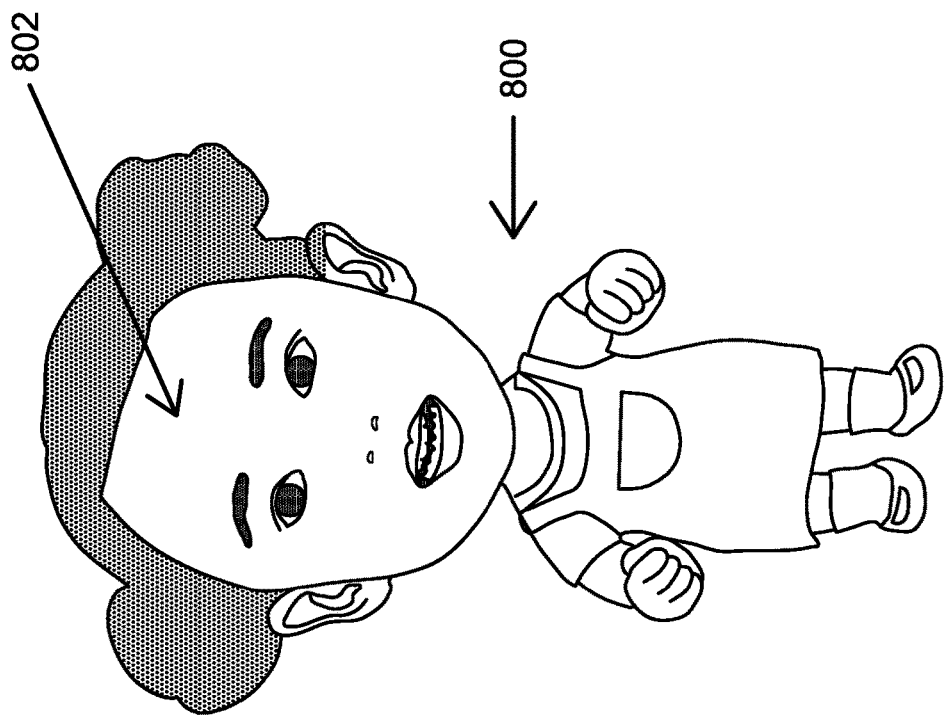
FIG. 8C is an example screenshot of an example electronic publication generated with the system for manipulating a facial image; and, FIG. 8D is an example screenshot of an example electronic publication generated with the system for manipulating a facial image.
Figure 8C:
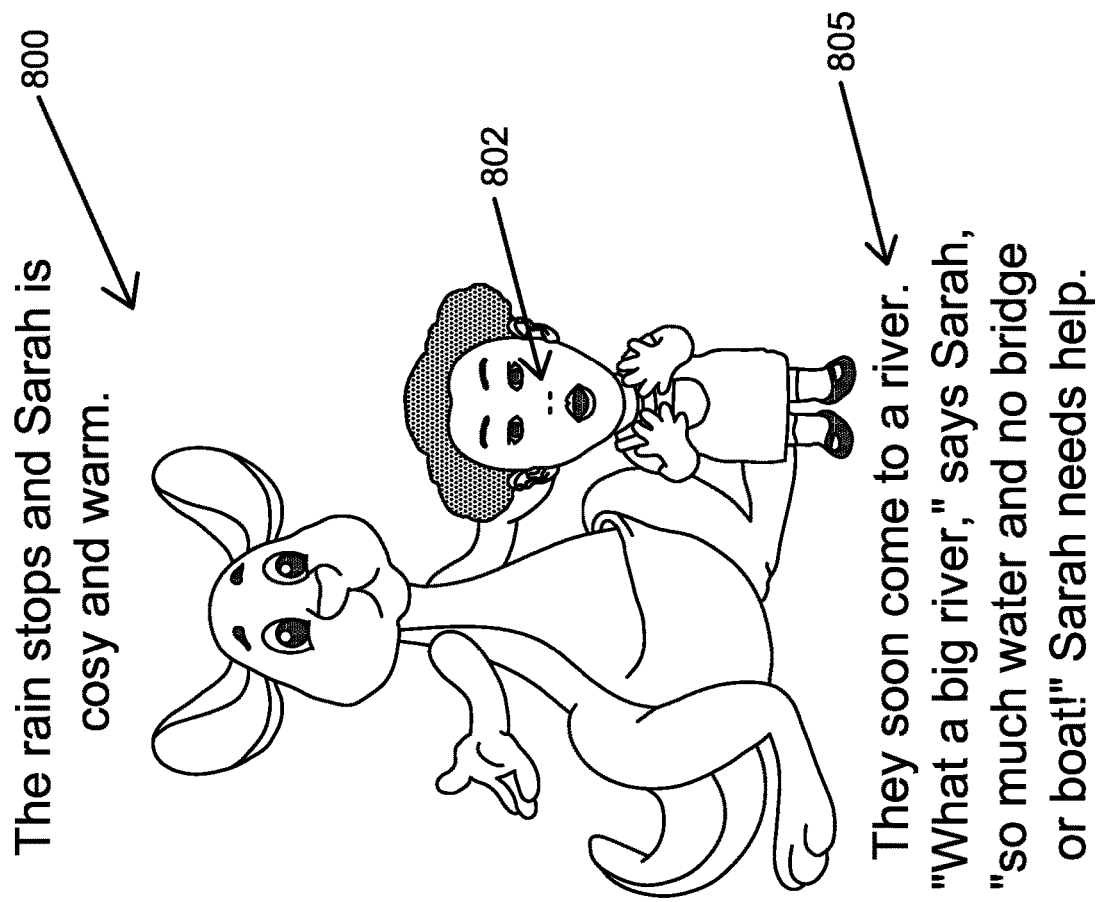

With reference to FIG. 7, there is illustrated a flow diagram of another embodiment of the system for manipulating a facial image 700. In this embodiment, the system 700 is arranged to receive a facial photo 702 from a subject. Once the photo 702 is received, the photo is processed concurrently by a segmentation process 704 which is then arranged to segment the photo into multiple segments associated with each facial feature of the subject of the photo. Concurrently, a set of manipulation parameters 706 is determined for the purposes of manipulating the facial features based on the pronunciation of the phoneme 712 and any emotion (facial characteristics) 714 which is intended to be expressed by the subject of the photo.

The determination of the manipulation parameters 706 is undertaken by firstly identifying any specific personal attributes 708 the subject of the photo may have. Examples of these attributes 708 may include checking if the features of the subject deviate somewhat from a standard facial topology 710. An image comparison can be undertaken by mapping the photo against a standard facial topology model 710 and identifying if the facial features of the subject substantially deviate from the standard topology 710. These deviations may include variations as to the size of the facial features of the subject of the photo, such as if the mouth of the subject is larger or smaller than normal, if the eyes are larger, smaller, curved, narrow, wide when compared with the standard topology. Such deviations can then in turn be used to adjust the manipulation parameters 706 that are determined based on the phoneme 712 being pronounced or the emotion 714 which is to be expressed by the subject.

Once the manipulation parameters 706 are determined, the photo is then manipulated 716, 718 with each original segment being blanked out (patching), then each segment is then manipulated based on the manipulation parameters 706 and are in turn replaced within the photo as replacement segments. Prior to each segment being replaced within the photo, the edges of each segment being replaced is further manipulated based on any distortions 716 as applicable based on any facial characteristics. In turn, the boundary of each segment is then manipulated and softened 719 based on the facial characteristics that are being modelled or to ensure each segment can be placed back into the photo without significant distortion. After each segment required to be replaced is replaced by a replacement segment, the photo 720 has been manipulated and can be return to the user, stored, or further processed as part of an animation.

Certain embodiments of the system described above may also be implemented to generate dynamic content which can be distributed with an e-book. As an example, by requesting for a single photograph of an end user, the literary works can include dynamic content that can be generated with the photograph of the user. This dynamic content, which may include an animation of the user based on the original photograph, can then be distributed to an e-book viewer for the user to study. By including this animation or modification of the original photograph, the author of the e-book content can incorporate the user into its story, either from the perspective of telling or animating the e-book literary work, or by including the user's photo as part of the literary work's story or theme. Users in turn can select which character to play, and with the embodiments of Facial Expression and phoneme pronunciation animation, users can also see themselves speaking a foreign language and playing a role. The only input from the user is an upload of one photo.

The advantage of such a system also allows for individual users to simulate their facial expression, characteristics and pronunciation of individual words and thus providing an opportunity for individual users to produce an animation of themselves, others or for inanimate objects for entertainment, education or commercial purposes. Within the education field, users who wish to acquire language skills relating to a second or third language can watch a model or simulation of themselves pronouncing an individual word and thus giving them an opportunity to copy the animation sequences to follow mouth movements so as to prefect the pronunciation of individual words. Furthermore, the ability of the system in including facial characteristics as well as facial expressions provide additional dimensions in which users are able to animate themselves or others for visual accuracy or entertainment purposes.

With reference to FIGS. 8A to 8D, there are shown a number of example screenshots of an electronic publication, such as an e-book, which includes an animation or facial image that has been generated by an embodiment of the system for manipulating a facial image.

As shown in these figures, a page or screen 800 of an electronic publication can be generated by including a manipulated image of a subject 802 to show a particular emotion. Preferably, the image of the subject 802 is also manipulated by the system for manipulating a facial image so as to animate the subject 802 to read a particular sentence or phrase 805 relevant to the story. In these examples, the e-book may call upon an embodiment of the system for manipulating a facial image so as to generate these manipulated images or animations and subsequently integrated these within the e-book for distribution or delivery to the end user.

These example embodiments may be advantageous in that it allows a user to be integrated to an e-book itself through the manipulation and/or animation of the user's facial image so as to customize the e-book for the user. The inclusion of these manipulated and/or animated images allows the user to be integrated within a story and in turn enhances the quality and interest of the e-book that is delivered to the user. Furthermore, as the system for manipulating a facial image can be called in real time or in advance of the generation of the e-book, the generation of the e-book, that is the image customization process, can also be efficiently completed with minimal computing and communication resources. In turn, the e-book may be generated upon the completion of a purchase by a user, and then transmitted to the user for study almost within a very short period of time after receiving the user's facial image.

This image customization process may also be advantageous in that it may be able to advance electronic publications to a new level of entertainment and information acquisition. It may also offer publishers the option of submitting existing materials for conversion. As an example, in the case of a novel, the system may be able to be arranged to perform image replacements to enable customer's selection of which role to play within a novel or play. In other applications such as within a cosmetic/fashion brochure, the system may also be arranged to perform a head/body swap for the customer to evaluate how he or she would look in makeup or in a shirt or dress as depicted by the supplier. In some of these examples, the customer's image may also be further manipulated so as to include the application of eyelining techniques or other enhancement or cosmetic procedures as appropriate to enhance an individual's facial features (e.g. enlarging eyes, lips etc). Due to the methods of analysis and computation functions of examples of the system for manipulated facial images, a large number of parameters are taken into account (e.g. 22 emotions, 42 phonemes pertaining to the English language, 10 cosmetic techniques) and thus, in turn, some embodiments of the system are able to add and enhance visual effects to a user's face which can be the subject of a publication, animation, game or interface.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for manipulating a facial image comprising the steps of:
   segmenting, using one or more processors, a single received facial image into multiple segments, wherein each of the segments is associated with one or more facial features of a subject;
   determining, using the one or more processors and from the segments, one or more segments to be manipulated to simulate pronunciation of a phoneme by the subject based on a query with a segment database, the segment database including a listing of phonemes and one or more associated segments that have to be manipulated to simulate pronunciation of the corresponding phoneme;
   patching, using the one or more processors, the one or more segments that will be affected by the pronunciation of the phoneme;
   retrieving, using the one or more processors, from a database or lookup table storing manipulation parameters for each segment of the facial image associated with different phonemes, a set of manipulation parameters for each segment corresponding to the phoneme to be pronounced, the manipulation parameters including mathematical function arranged to be applied for changing shape of the corresponding segments;
   manipulating, using the one or more processors, the one or more segments based on the retrieved mathematical function, thereby manipulating one or more points or curves of the corresponding segment to change the shape of the segment for generating simulated positions of the segment associated with the pronunciation of the phoneme by the subject; and
   generating, using the one or more processors, one or more manipulated facial images of the subject in pronouncing the phoneme.

2. The method for manipulating a facial image in accordance with claim 1, wherein the mathematical function includes a Bezier, quadratic, or cubic function.

3. The method for manipulating a facial image in accordance with claim 1, wherein patching the one or more segments further comprises rendering the respective segment with a segment colour and intensity based on a colour and intensity of the one or more edges of the respective segment.

4. The method for manipulating a facial image in accordance with claim 3, wherein the segment colour and intensity is determined based on an average of the colour and intensity of the one or more edges of the respective segment.

5. The method for manipulating a facial image in accordance with claim 4, wherein the step of manipulating the one or more segments further includes a step of blending the one or more manipulated segments into the facial image.

6. The method for manipulating a facial image in accordance with claim 5, wherein the one or more manipulated segments are blended onto a patched segment of the facial image.

7. The method for manipulating a facial image in accordance with claim 6, wherein the step of blending the one or more manipulated segments onto a patched segment of the facial image includes rendering image portions between the edges of the manipulated segment and the edges of the patched segment with a portion colour and intensity based on the pixel colour and intensity of the edges of the manipulated segments and the patched segments.

8. The method for manipulating a facial image in accordance with claim 7, wherein the portion colour and intensity is determined by processing the pixel colour and intensity of the edges of the manipulated segments and the patched segments.

9. The method for manipulating a facial image in accordance with claim 8, wherein the portion colour and intensity of the edges of the manipulated segments and the patched segments is processed based on a facial characteristic.

10. The method for manipulating a facial image in accordance with claim 1, wherein the step of manipulating the facial image to generate the manipulated facial image of the subject includes the step of manipulating the one or more segments of the facial image based on simulated positions of the one or more segments associated with a facial expression of the subject.

11. The method for manipulating a facial image in accordance with claim 10, wherein the step of manipulating the one or more segments of the facial image based on simulated positions of the one or more segments associated with a facial expression of the subject includes:
determining one or more segments affected by the facial expression of the subject;
determining one or more expression segment relationships each arranged to represent an adjustment of the segment based on the facial expression; and
manipulating the one or more affected segments with the one or more expression segment relationships.

12. The method for manipulating a facial image in accordance with claim 11, wherein the one or more facial segments are further manipulated based on the facial characteristics.

13. The method for manipulating a facial image in accordance with claim 1, wherein patching the one or more segments comprises determining, using the one or more processors, a mathematical function of a curve representative of one or more edges of the respective segment.

14. The method for manipulating a facial image in accordance with claim 1, further comprising receiving the single facial image of the subject.

15. A system for manipulating a facial image comprising:
one or more processors arranged to:
segment a single facial image into multiple segments, wherein each of the segments is associated with one or more facial features of a subject;
determine, from the segments, one or more segments to be manipulated to simulate pronunciation of a phoneme by the subject based on a query with a segment database, the segment database including a listing of phonemes and one or more associated segments that have to be manipulated to simulate pronunciation of the corresponding phoneme;
patch the one or more segments that will be affected by the pronunciation of the phoneme;
retrieve, from a database or lookup table storing manipulation parameters for each segment of the facial image associated with different phonemes, a set of manipulation parameters for each segment corresponding to the phoneme to be pronounced, the manipulation parameters including mathematical function arranged to be applied for changing shape of the corresponding segments;
manipulate the one or more segments based on the retrieved mathematical function, thereby manipulating one or more points or curves of the corresponding segment to change the shape of the segment for generating simulated positions of the segment associated with the pronunciation of the phoneme by the subject; and
generate one or more manipulated facial images of the subject in pronouncing the phoneme.

16. The system for facial animation in accordance with claim 15, wherein the mathematical function includes a Bezier, quadratic, or cubic function.

17. The system for manipulating a facial image in accordance with claim 15, wherein the one or more processors are further arranged to patch the one or more segments by rendering the one or more segments with a segment colour and intensity based on a colour and intensity of the one or more edges of the respective segment.

18. The system for manipulating a facial image in accordance with claim 17, wherein the segment colour and intensity is determined based on an average of the colour and intensity of the one or more edges of the respective segment.

19. The system for manipulating a facial image in accordance with claim 18, wherein the one or more processors are further arranged to blend the one or more manipulated segments into the facial image.

20. The system for manipulating a facial image in accordance with claim 19, wherein the one or more manipulated segments are blended onto a patched segment of the facial image.

21. The system for manipulating a facial image in accordance with claim 20, wherein when the one or more manipulated segments are blended onto a patched segment of the facial image, image portions between the edges of the manipulated segment and the edges of the patched segment are rendered with a portion colour and intensity based on the pixel colour and intensity of the edges of the manipulated segments and the patched segments.

22. The system for manipulating a facial image in accordance with claim 21, wherein the portion colour and intensity is determined by processing the pixel colour and intensity of the edges of the manipulated segments and the patched segments.

23. The system for manipulating a facial image in accordance with claim 22, wherein the portion colour and intensity of the edges of the manipulated segments and the patched segments is processed based on a facial characteristic.

24. The system for manipulating a facial image in accordance with claim 15, wherein the one or more processors are arranged to manipulate the one or more segments of the facial image based on simulated positions of the one or more segments associated with a facial expression of the subject.

25. The system for manipulating a facial image in accordance with claim 24, wherein the one or more processors are further arranged to:
- determine one or more segments affected by the facial expression of the user;
- determine one or more expression segment relationships each arranged to represent an adjustment of the segment based on the facial expression; and
- manipulate the one or more affected segments with the one or more expression segment relationships.

26. The system for manipulating a facial image in accordance with claim 25, wherein the one or more facial segments are further manipulated based on the facial characteristics.

27. The system for manipulating a facial image in accordance with claim 15, wherein the one or more processors are arranged to patch the one or more segments by determining a mathematical function of a curve representative of one or more edges of the respective segment.

\* \* \* \* \*

UNITED STATES PATENT AND TRADEMARK OFFICE
CERTIFICATE OF CORRECTION

PATENT NO. : 10,600,226 B2  
APPLICATION NO. : 15/460417  
DATED : March 24, 2020  
INVENTOR(S) : Yam Page 1 of 1

It is certified that error appears in the above-identified patent and that said Letters Patent is hereby corrected as shown below:

On the Title Page

Item no. (73) Should read as follows:  
Success Asia Inc. Limited, Causeway Bay (HK)

Signed and Sealed this  
Second Day of June, 2020

Andrei Iancu  
*Director of the United States Patent and Trademark Office*